(12) United States Patent
Fukui et al.

(10) Patent No.: US 8,038,194 B2
(45) Date of Patent: Oct. 18, 2011

(54) MOUNTING STRUCTURE OF DECK SIDE TRIM

(75) Inventors: Kazuo Fukui, Kariya (JP); Nobuhide Hashimoto, Kariya (JP); Teruji Kuroyanagi, Kariya (JP); Kenji Atarashi, Nagoya (JP); Fumio Sugimoto, Nagoya (JP)

(73) Assignees: Toyota Shatai Kabushiki Kaisha, Kariya-shi (JP); Hayashi Telempu Co., Ltd., Nagaoya-shi (JP)

( * ) Notice: Subject to any disclaimer, the term of this patent is extended or adjusted under 35 U.S.C. 154(b) by 391 days.

(21) Appl. No.: 12/416,580

(22) Filed: Apr. 1, 2009

(65) Prior Publication Data

US 2009/0256373 A1    Oct. 15, 2009

(30) Foreign Application Priority Data

Apr. 15, 2008    (JP) ................................. 2008-105941

(51) Int. Cl.
B60R 7/02    (2006.01)
B62D 25/02    (2006.01)
(52) U.S. Cl. .................. 296/24.43; 296/37.16; 296/39.1
(58) Field of Classification Search ............... 296/24.43, 296/37.16, 98, 39.1, 191
See application file for complete search history.

(56) References Cited

U.S. PATENT DOCUMENTS

| 4,168,094 A | * | 9/1979 | Yagi ............................ 296/37.16 |
| 5,618,077 A | * | 4/1997 | Ament et al. .............. 296/37.16 |
| 2002/0113465 A1 | * | 8/2002 | Inari et al. ..................... 296/214 |
| 2006/0049651 A1 | * | 3/2006 | Selvini et al. ................ 296/1.02 |

FOREIGN PATENT DOCUMENTS

| EP | 0234497 | * | 2/1987 |
| JP | 63-16943 | | 2/1988 |
| JP | 9-39679 | | 2/1997 |
| WO | WO 2006/131823 A1 | | 12/2006 |
| WO | WO 2008/015511 A1 | | 2/2008 |

OTHER PUBLICATIONS

Office Action issued Aug. 11, 2010, in China Patent Application No. 200910133564.1 (with English translation).

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

The deck side trim includes accommodating recesses in which left and right ends of a cover accommodating body are accommodated and disposed. A clamp portion provided at its side with an engaging pawl is provided in the accommodating recess. The clamp portion is provided with an inner hole having an opening at least on the accommodating recess side. A cap body for closing the opening is disposed in the inner hole. The cap body includes a cap leg and a cap head. When the cap leg of the cap body is fitted into the inner hole, the engaging pawl in the clamp portion is pushed outward, and the engaging pawl is engaged with the body engaging portion provided on the vehicle body.

3 Claims, 18 Drawing Sheets

MOUNTING STRUCTURE OF DECK SIDE TRIM

CROSS-REFERENCES TO RELATED APPLICATIONS

The present application claims priority under 35 U.S.C. §119 to Japanese application No. 2008-105941, filed Apr. 15, 2008, entitled "MOUNTING STRUCTURE OF DECK SIDE TRIM". The contents of this application are incorporated herein by reference in their entirety.

BACKGROUND OF THE INVENTION

1. Field of the Invention

The present invention relates to a mounting structure of a deck side trim for mounting on a vehicle body, the deck side trim is disposed on a side surface of a luggage space in a rear portion of a vehicle.

2. Description of the Related Art

In order to enhance design performance in a vehicle, deck side trims are mounted on left and right side surfaces of a luggage space provided in a rear portion of a vehicle such as a passenger vehicle (see JP 1988-16943 Unexamined Utility Model Application (Kokai) and JP 1997-39679 Unexamined Patent Publication (Kokai), for example).

When mounting such a deck side trim on the vehicle body, as shown in FIG. 18, the deck side trim 9 is fixed to the vehicle body using a bolt 92 at a predetermined location of the deck side trim 9. That is, the deck side trim 9 is provided with a fastening portion 91, a bolt insertion hole 911 is formed in the fastening portion 91, and a boss member 912 projects from the bolt insertion hole 911 toward the vehicle body 2. The boss member 912 is brought into abutment against the vehicle body 2, the bolt 92 is inserted through the bolt insertion hole 911, an inner side of the boss member 912 and a through hole 29 formed in the vehicle body 2, the bolt 92 is threadedly engaged with a nut 93, thereby the deck side trim 9 is mounted on the vehicle body 2.

Depending upon a vehicle type, a tonneau cover covering the luggage space from above is disposed such that the tonneau cover is suspended from the left and right deck side trims (see FIGS. 15 to 17) in some cases. The tonneau cover can be wound and accommodated in a cover accommodating body, and the tonneau cover is pulled out from the cover accommodating body to cover the luggage space as needed. Accommodating recesses in which left and right ends of the cover accommodating body are accommodated are formed on the left and right deck side trims, respectively.

A load caused by the cover accommodating body is applied to the accommodating recess. Therefore, the fastening portion 91 is disposed on this portion and it is fastened to and fixed to the vehicle body 2 in some cases.

However, if the deck side trim is fixed to the vehicle body by means of a bolt, the following problems come up.

That is, since the deck side trim is mounted in a vehicle interior, an assembling operator leans out the upper half of his body into the vehicle interior and fastens the bolt using an impact wrench or the like. At that time, the operating posture of the operator is tight, and there is a problem that the operating efficiency is lowered.

Especially when there is a fastening portion in the accommodating recess of the cover accommodating body of the tonneau cover, the operating efficiency might be further lowered. That is, the position of the accommodating recess is immediately next to a rear sheet in many cases due to the function of the tonneau cover, and at this position, a pillar of the vehicle body hinders the operation in many cases.

Further, if the accommodating recess has the fastening portion, it is difficult to visually confirm the situation, and the operability might be further deteriorated.

If the fastening operation is carried out in the state where the operability is poor as described above, the deck side trim might be damaged by, for example, a bolt or an impact wrench.

If the bolt is fastened in such a manner as described above, the bolt is exposed from the design surface of the deck side trim, and the outward appearance design in the vehicle interior might be deteriorated. A cap covering the bolt can be mounted on the deck side trim, but in this case, the number of parts used is increased, and the production efficiency is deteriorated.

SUMMARY OF THE INVENTION

The present invention has been made in view of the conventional problems, and the invention provides a mounting structure of a deck side trim in which the mounting operability on the vehicle body is excellent, the number of parts used is small and the outward appearance design is excellent.

The present invention provides a mounting structure of a deck side trim for mounting on a vehicle body, wherein the deck side trim is disposed on a side surface of a luggage space in a rear portion of a vehicle, and is provided at its upper side with accommodating recesses in which are accommodated and disposed left and right ends of a cover accommodating body which winds and accommodates a tonneau cover covering the luggage space, the accommodating recess is provided with a clamp portion which is formed so as to project toward the vehicle body and which is provided at its side with an engaging pawl that is engaged with the vehicle body, the clamp portion includes an inner hole which is provided with an opening at least on the accommodating recess side, the inner hole being formed from the opening toward a tip end in an axial direction, a cap body for closing the opening is disposed in the inner hole, the cap body including a cap leg fitted into the inner hole and a cap head formed on a rear end of the cap leg, and when the cap leg of the cap body is fitted into the inner hole, the engaging pawl in the clamp portion is pushed outward, and the engaging pawl is engaged with a body engaging portion provided on the vehicle body.

Next, effects of the present invention will be explained.

In the mounting structure of the deck side trim, the deck side trim is fixed to the vehicle body using the cap body. Therefore, at least in a fastening portion using the cap body, the deck side trim can be fixed to the vehicle body by fitting the cap body into an inner hole of a clamp portion provided on the deck side trim. At that time, it is unnecessary to carry out the screwing operation unlike a case using a bolt or the like, and a tool such as an impact wrench is not required. Thus, it is easy to carry out the fastening operation.

It has been difficult to mount a deck side trim in the vehicle interior, but the deck side trim can easily be mounted on the vehicle body simply by fitting the cap body as described above. At the time of the assembling operation, it is possible to prevent the design surface of the deck side trim and the like from being damaged.

The cap head of the cap body can close the opening of the inner hole of the clamp portion which is opened on the side of the design surface of the deck side trim. Thus, the outward appearance design of the deck side trim can be enhanced.

Further, the cap body is a single member which has both a fixing function for engaging the engaging pawl of the clamp portion with the vehicle body, and a cap function for covering the opening. Thus, the number of parts used can be reduced and the mounting operability can be enhanced.

As explained above, according to the invention, it is possible to provide a mounting structure of a deck side trim in which the mounting operability on the vehicle body is excellent, the number of parts used is small and the outward appearance design is excellent.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

The present invention, the cap body can be formed of, for example, a resin molded body.

Further, it is preferable that the cap leg is provided at its side surface with a fixing engaging portion which engages with a clamp inner engaging portion provided on an inner wall of the inner hole when the cap leg is fitted into the inner hole of the clamp portion.

In this case, the cap body can easily and reliably be held in the inner hole of the clamp portion. With this, it is possible to easily fix the deck side trim to the vehicle body and to effectively prevent the deck side trim from being pulled out from the vehicle body.

That is, by engaging the fixing engaging portion with the clamp inner engaging portion, the cap body is fixed such that the cap body will not be pulled out from the inner hole of the clamp portion. Since the cap body is not pulled out from the inner hole of the clamp portion, the engaging pawl of the clamp portion does not return to the inner side. Therefore, the engaged state of the clamp portion with the vehicle body is reliably maintained.

Further, it is preferable that a portion of the cap leg closer to the tip end than the fixing engaging portion has a temporarily-attaching engaging portion which is capable of engaging with the clamp inner engaging portion.

In this case, the cap body can temporarily be attached to the deck side trim in a state before the deck side trim is mounted on the vehicle body. That is, since the portion of the cap leg has the temporarily-attaching engaging portion closer to the tip end than the fixing engaging portion, the cap body can temporarily be attached to the deck side trim by engaging the temporarily-attaching engaging portion with the clamp inner engaging portion. With this, if the cap body is pushed in after the deck side trim to which the cap body has been attached is positioned with respect to the vehicle body, the fixing engaging portion of the cap leg is engaged with the clamp inner engaging portion instead of the temporarily-attaching engaging portion, and the deck side trim is fixed to the vehicle body.

In this manner, if the cap leg has the temporarily-attaching engaging portion, the deck side trim can be fixed to the vehicle body more easily.

Embodiments

The embodiment of a mounting structure of a deck side trim of the present invention will be explained by using FIGS. 1 to 17.

Figure 15:
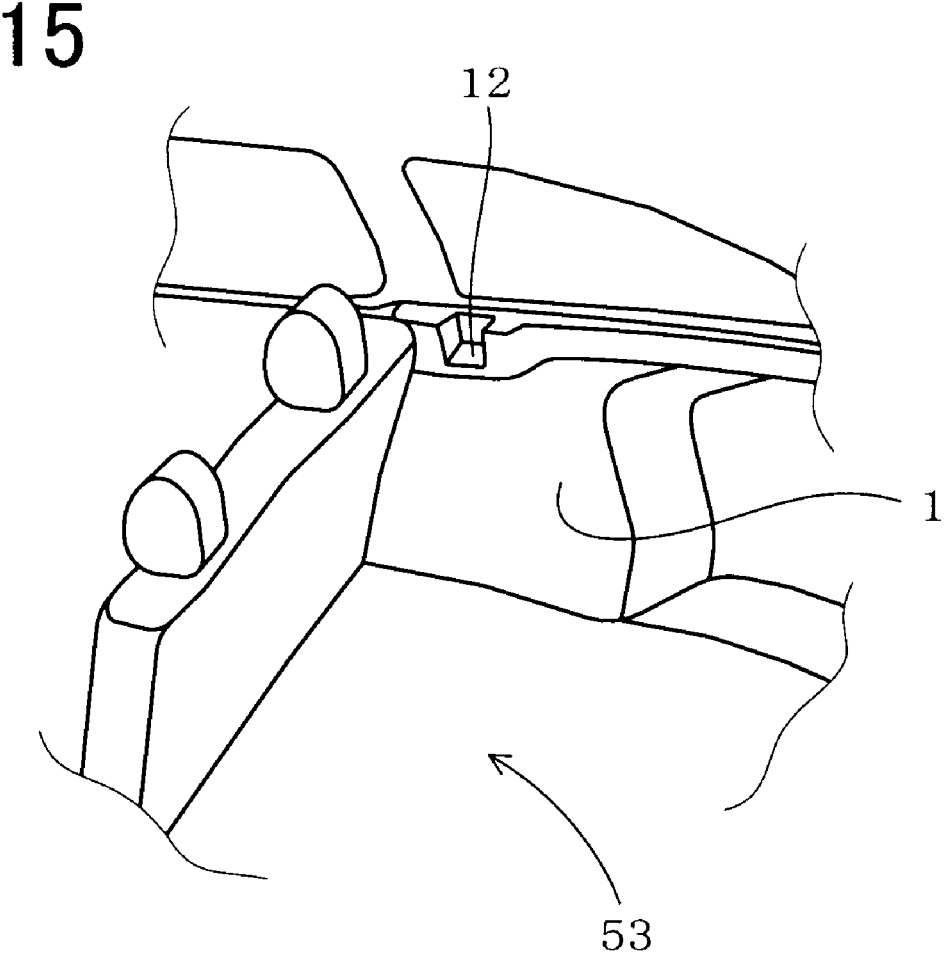
FIG. 15 is a perspective explanatory view of a rear portion of a vehicle on which the deck side trim is mounted in the embodiment.
Figure 16:
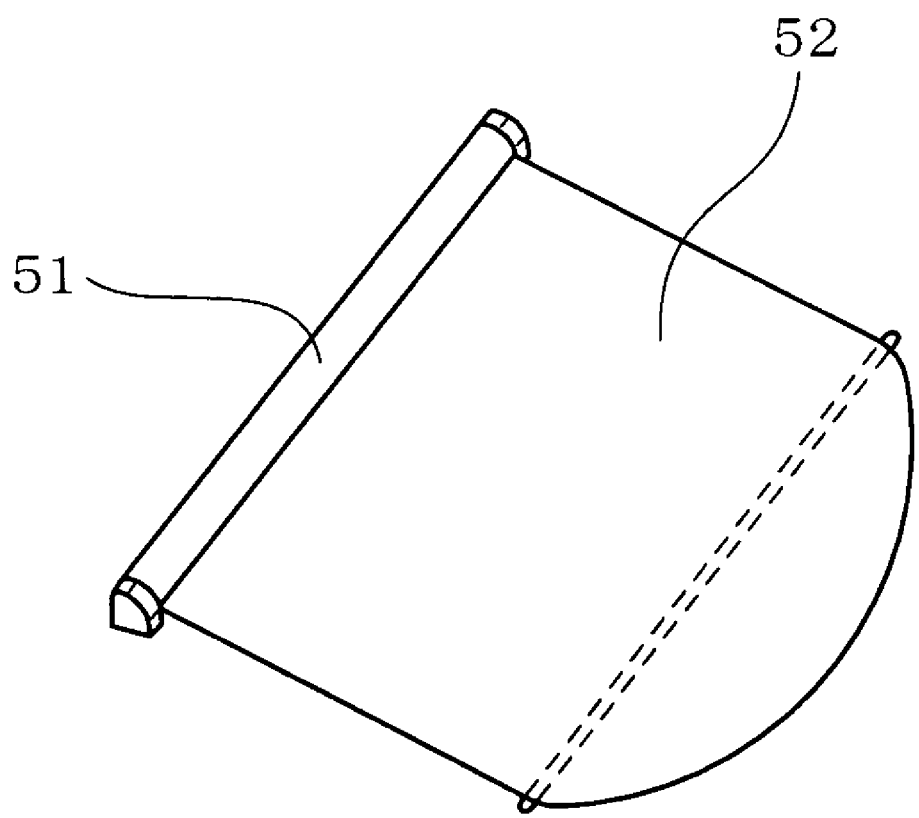
FIG. 16 is a perspective view of a tonneau cover of the embodiment.
Figure 17:
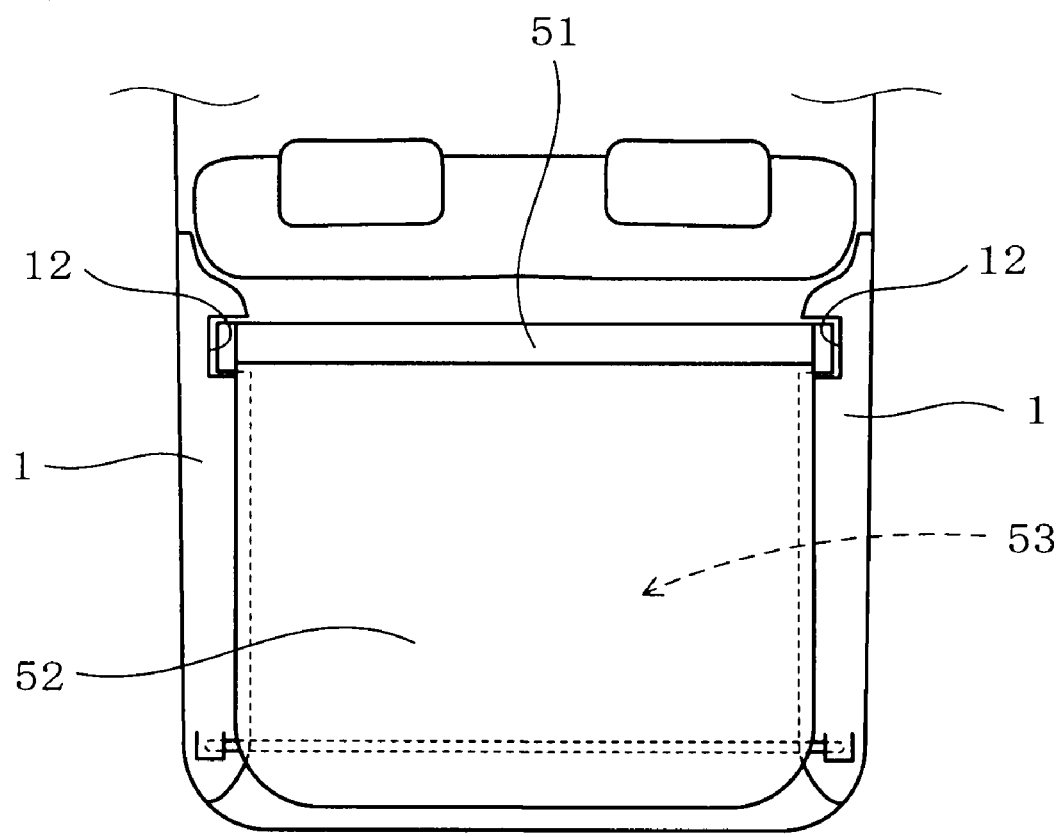
FIG. 17 is a plane explanatory view of the rear portion of the vehicle in which a luggage space is covered with the tonneau cover.

As shown in FIGS. 15 and 17, in the mounting structure of the deck side trim of the embodiment, the deck side trim 1 which is disposed on a side surface of a luggage space 53 in a rear portion of a vehicle is mounted on a vehicle body 2.

As shown in FIGS. 1, 11, 15 and 17, the deck side trim 1 is provided at its upper side with an accommodating recess 12 in which are accommodated left and right ends of a cover accommodating body 51 which winds and accommodates a tonneau cover 52 (FIG. 16) covering a luggage space 53.

Figure 1:
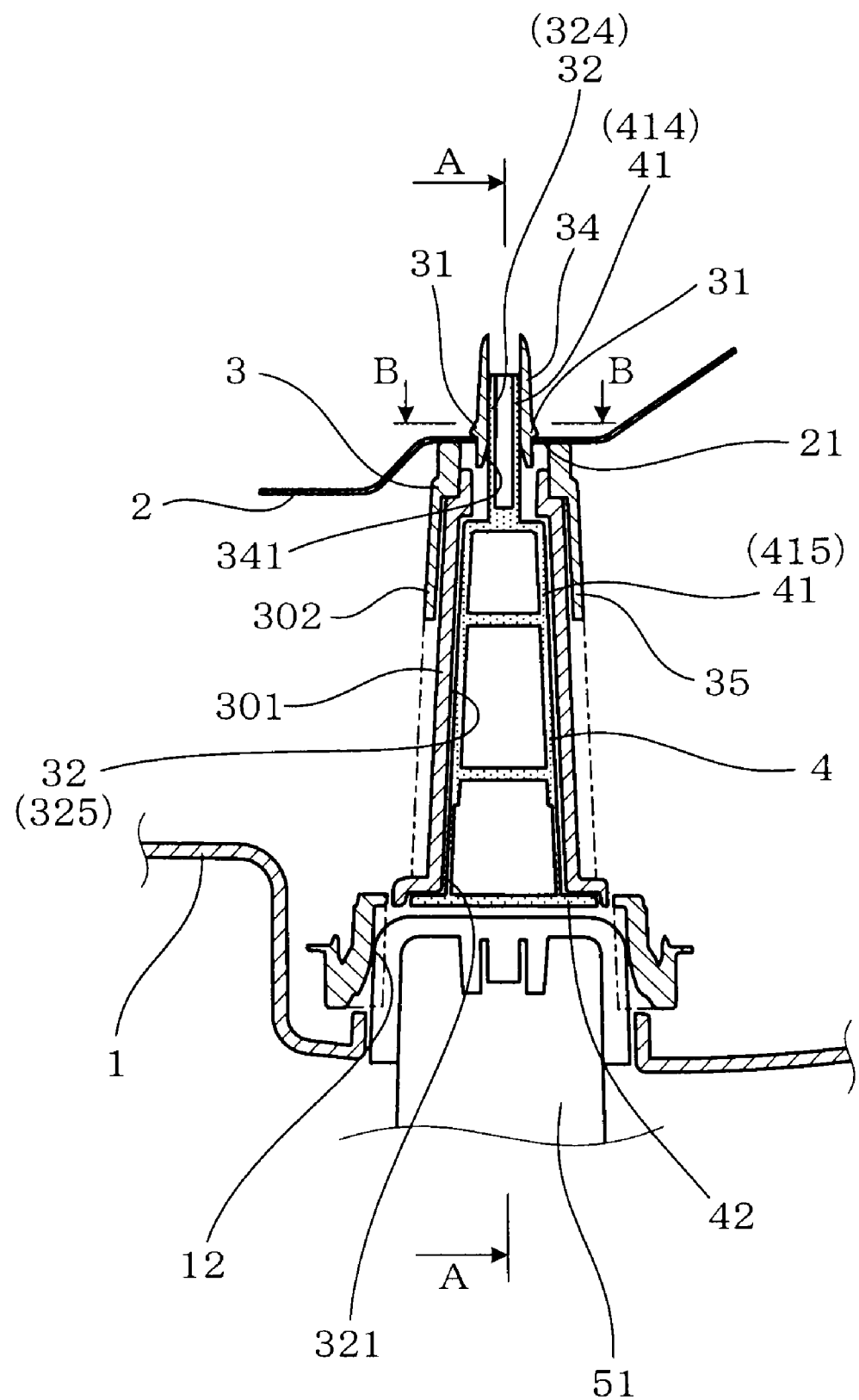
FIG. 1 is a sectional explanatory view of the mounting structure of a deck side trim in the embodiment.
Figure 2:
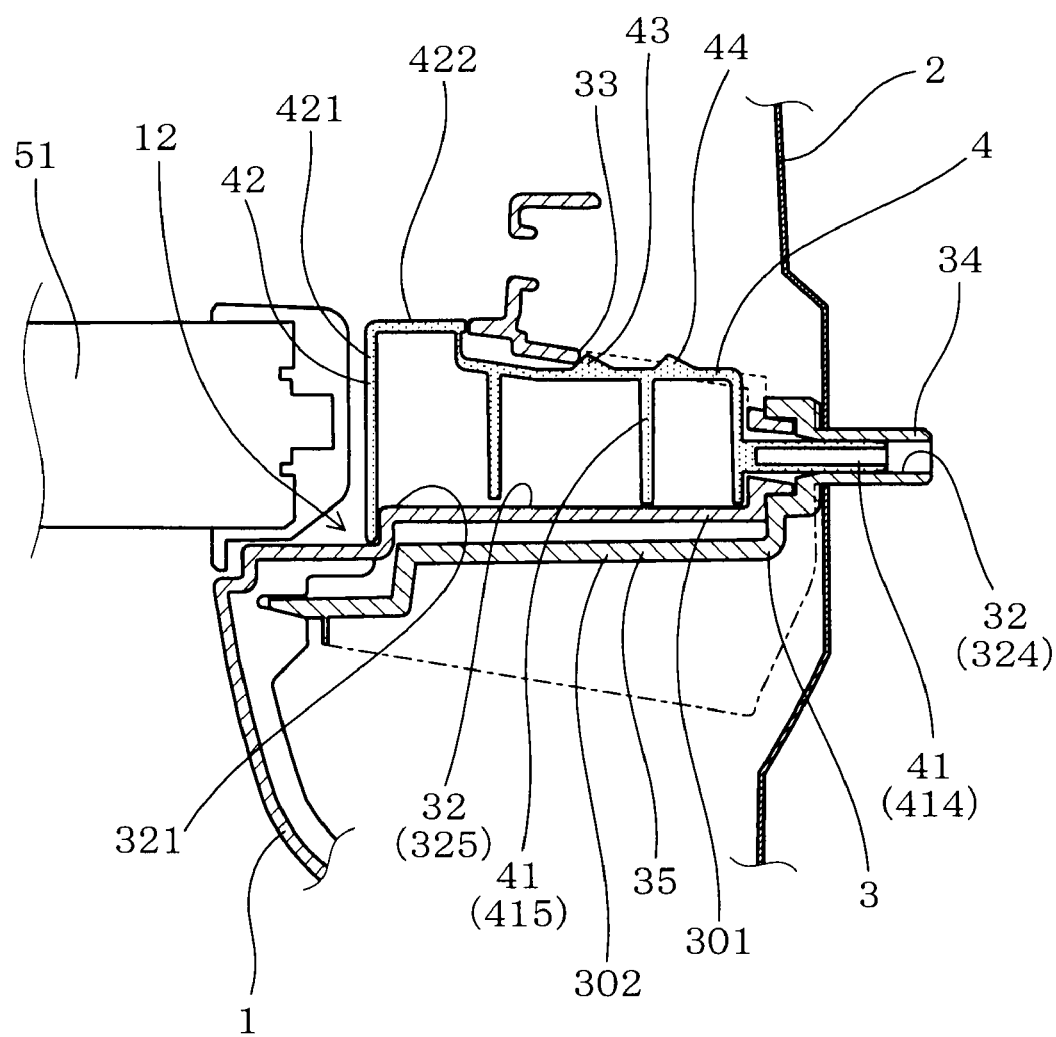
FIG. 2 is a sectional view taken along the line A-A in FIG. 1.

As shown in FIGS. 1 and 2, the accommodating recess 12 is provided with a clamp portion 3 which is formed so as to project toward the vehicle body 2. The clamp portion 3 is provided at its side with an engaging pawl 31 which is engaged with the vehicle body 2.

The clamp portion 3 has an opening 321 at least on the accommodating recess 12 side, and an inner hole 32 formed from the opening 321 toward a tip end side in its axial direction.

A cap body 4 for closing the opening 321 is disposed in the inner hole 32.

Figure 13:
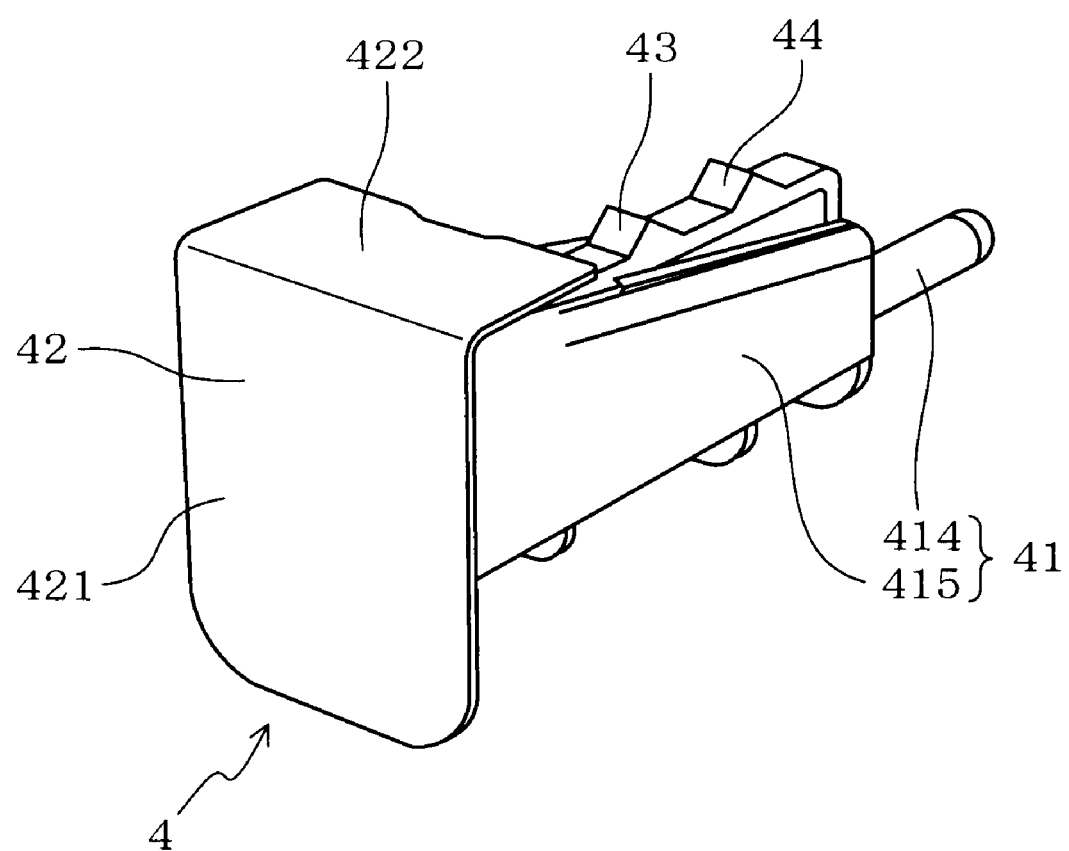
FIG. 13 is a perspective view of a cap body of the embodiment.

As shown in FIG. 13, the cap body 4 includes a cap leg 41 which is fitted into the inner hole 32, and a cap head 42 formed on a rear end of the cap leg 41.

As shown in FIGS. 1 and 2, when the cap leg 41 of the cap body 4 is fitted into the inner hole 32, the engaging pawl 31 in the clamp portion 3 is pushed outward, and the engaging pawl 31 is engaged with a body engaging portion 21 provided on the vehicle body 2.

As shown in FIGS. 1 to 8 and 12, the clamp portion 3 includes a clamp tip end 34 provided at its side surface with the engaging pawl 31, and a clamp base body 35 located between the clamp tip end 34 and the accommodating recess 12. The inner hole 32 includes a tip end inner hole 324 formed inside the clamp tip end 34, and a base body inner hole 325 formed inside the clamp base body 35. The tip end inner hole 324 is provided at its rear end (an end on the accommodating recess 12 side) with an inlet tapered portion 341 whose diameter is increased toward the rear end.

The clamp tip end 34 can elastically expand and contract in its radial direction.

The clamp portion 3 includes a clamp inner member 301 formed by projecting a portion of the deck side trim 1 toward the vehicle body 2, and a clamp outer member 302 fitted over the clamp inner member 301. The clamp tip end 34 is formed on the clamp outer member 302.

The clamp base body 35 includes the clamp inner member 301 and a portion of the clamp outer member 302.

As shown in FIG. 2, the cap leg 41 of the cap body 4 is provided at its side surface with a fixing engaging portion 43. The fixing engaging portion 43 is engaged with a clamp inner engaging portion 33 provided on an inner wall of the inner hole 32 when the cap leg 41 is fitted into the inner hole 32 of the clamp portion 3. The clamp inner engaging portion 33 is formed on a portion of the clamp inner member 301.

A temporarily-attaching engaging portion 44 (see FIG. 4) is provided on a portion of the cap leg 41 closer to the tip end than the fixing engaging portion 43. The temporarily-attaching engaging portion 44 is capable of engaging with the clamp inner engaging portion 33.

As shown in FIGS. 1 to 8 and 13, the cap leg 41 of the cap body 4 includes a leg tip end 414 fitted into the tip end inner hole 324, and a leg base body 415 formed between the leg tip end 414 and the cap head 42 and fitted into the base body inner hole 325. The leg base body 415 is formed with the fixing engaging portion 43 and the temporarily-attaching engaging portion 44. The fixing engaging portion 43 and the temporarily-attaching engaging portion 44 project to the outside in triangular forms.

The cap head 42 of the cap body 4 has a flat back surface 421 and an upper surface 422 which is continuous with the back surface 421 at a right angle.

The cap body 4 is formed of a resin molded body such as PP (polypropylene), ABS resin (acrylonitrile butadiene styrene copolymer resin).

Figure 14:
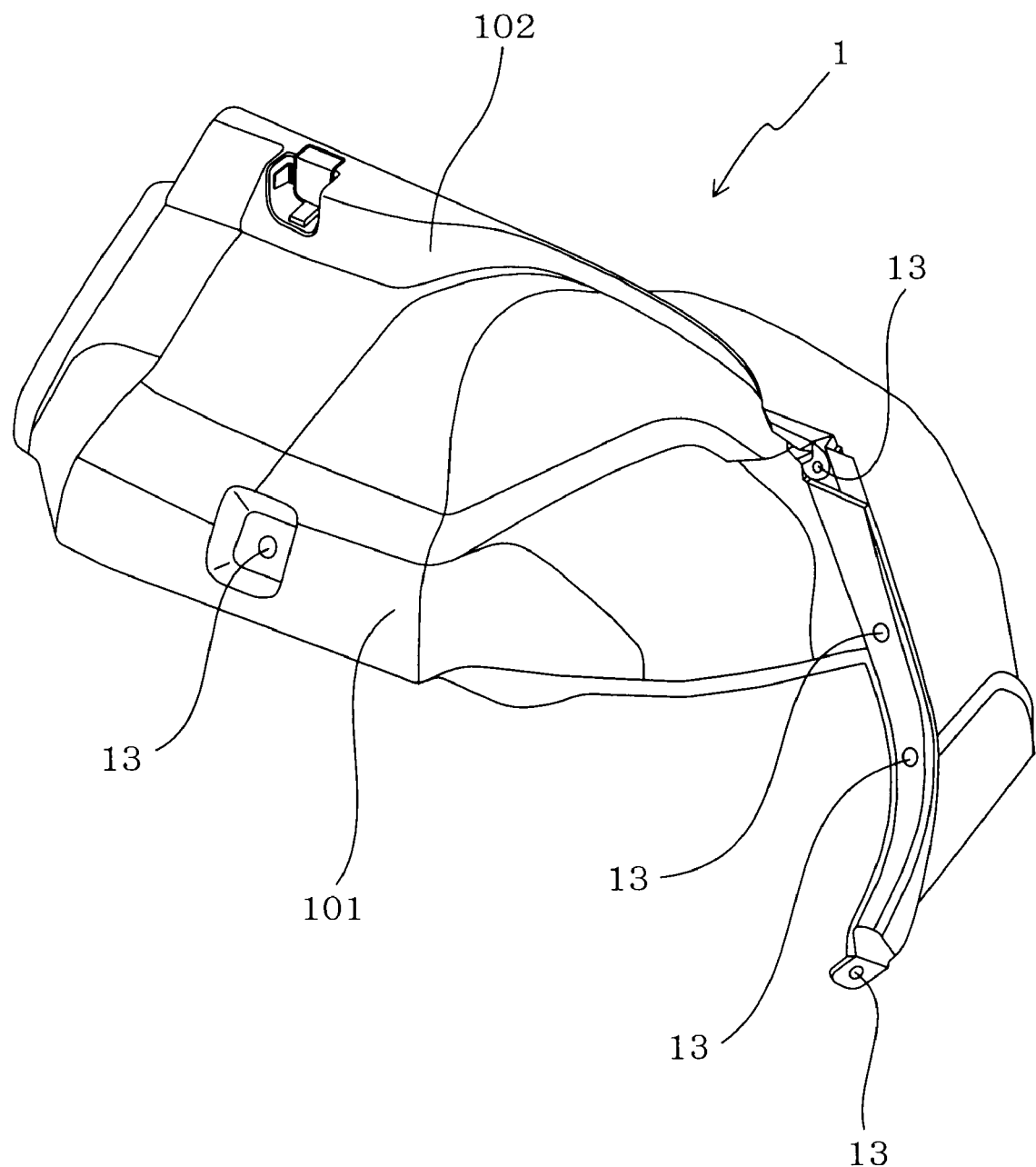
FIG. 14 is a perspective view of the deck side trim of the embodiment.

As shown in FIG. 14, the deck side trim 1 is configured by a body 101 and an upper member 102 formed on an upper side of the body 101. The upper member 102 includes at least the accommodating recess 12 and the clamp portion 3 as constituent elements. The upper member 102 comprises a resin molded body such as PP and ABS resin.

The clamp outer member 302 of the clamp portion 3 shown in FIGS. 1 to 8 can include a compact using resin which is easily elastically deformed such as PBT (polybutylene terephthalate).

Figure 3:
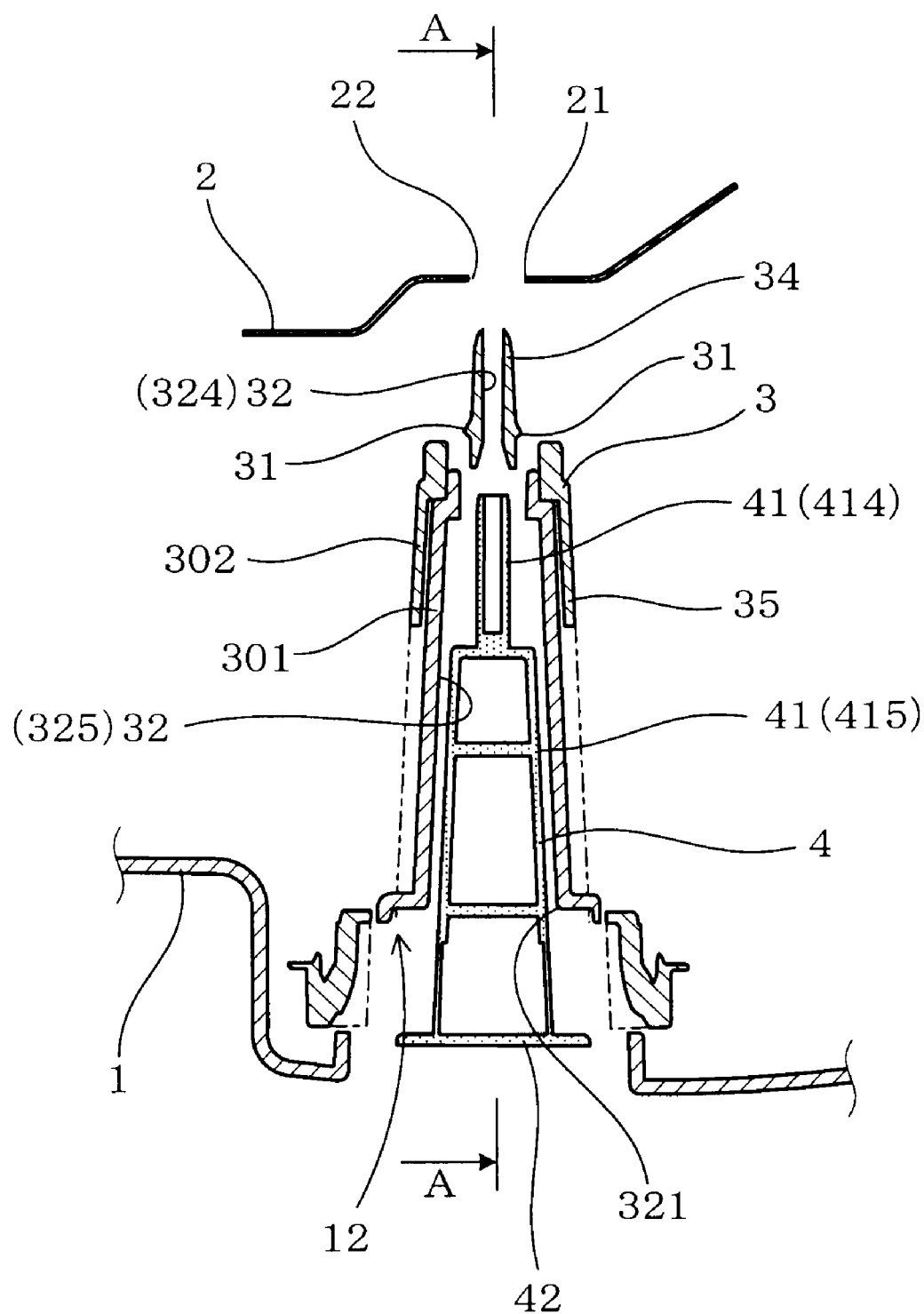
FIG. 3 is a sectional explanatory view of a state immediately before the deck side trim is disposed on the vehicle body in the embodiment.
Figure 4:
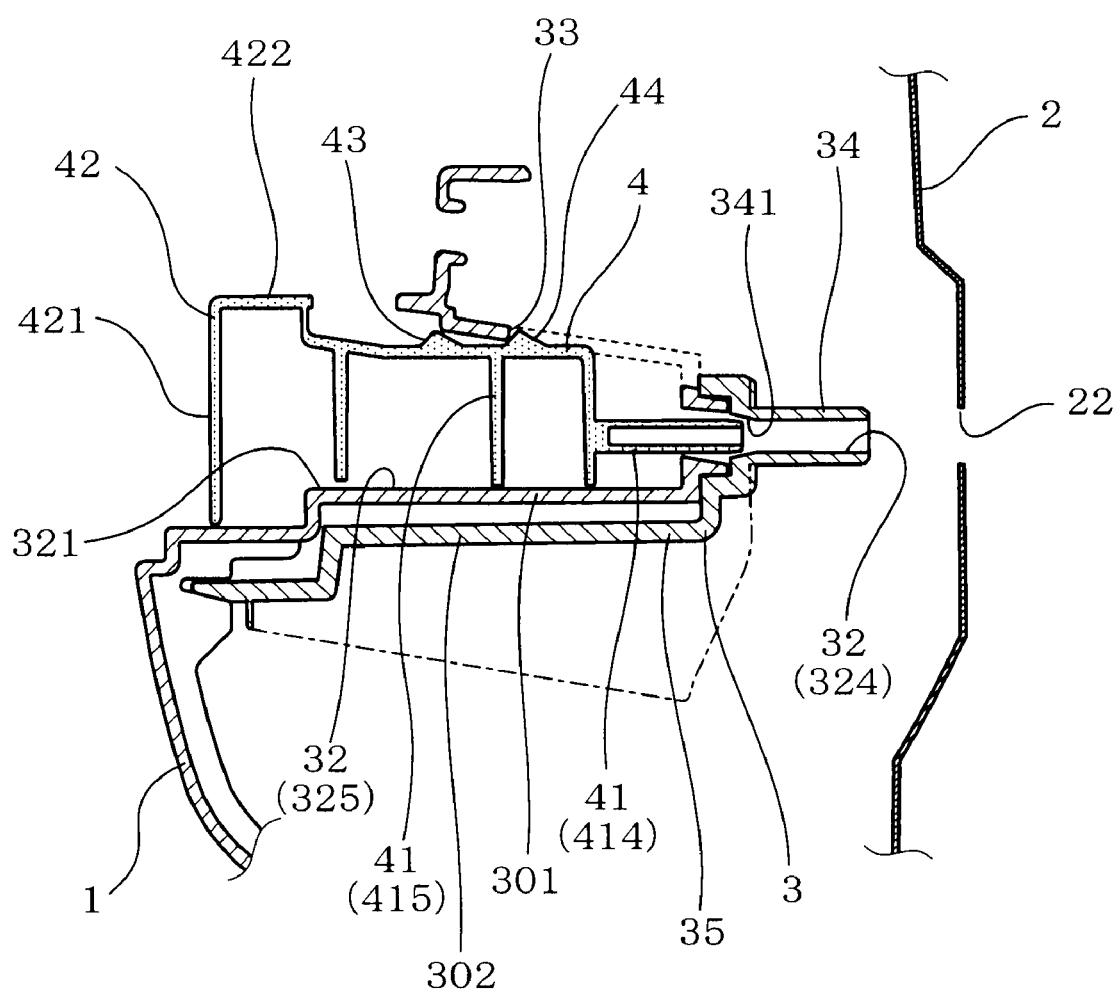
FIG. 4 is a sectional view taken along the line A-A in FIG. 3.
Figure 9:
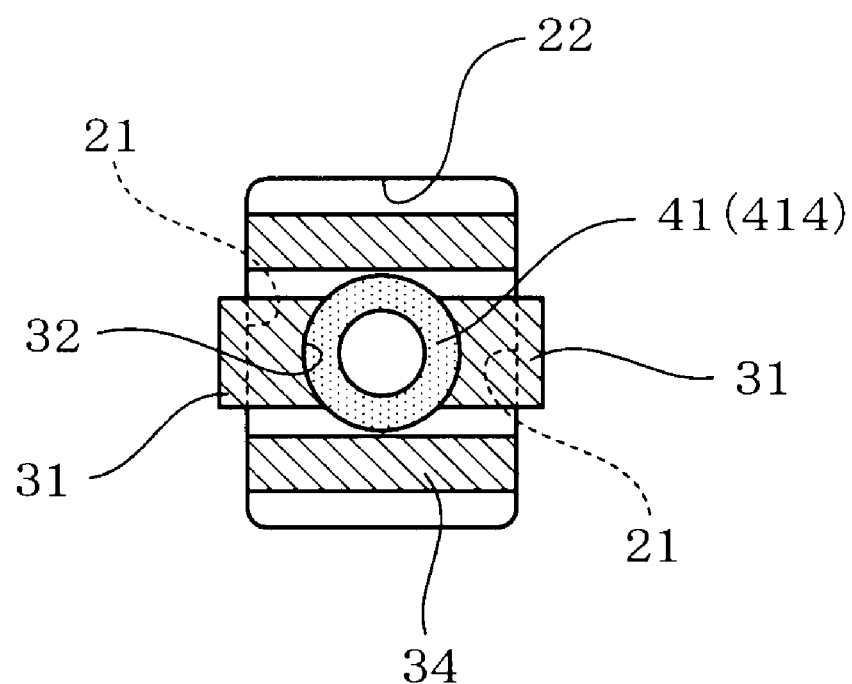
FIG. 9 is a sectional view taken along the line B-B in FIG. 1.

As shown in FIGS. 3 and 4, the vehicle body 2 is provided with a body opening 22 for forming the body engaging portion 21 with which the clamp portion 3 is engaged. As shown in FIGS. 1, 2 and 9, the clamp tip end 34 is inserted into the body opening 22, and the tip end surface of the clamp base body 35 abuts against the vehicle body 2. A pair of the engaging pawls 31 provided on the clamp tip end 34 are engaged with the body engaging portions 21 formed on the pair of opposed sides of the body opening 22.

As shown in FIG. 14, the deck side trim 1 is provided at its plural locations with fixing portions 13 which are fixed to the vehicle body 2, in addition to the location of the accommodating recess 12. Examples of a fixing means in the plurality of fixing portions 13 are means for engaging the deck side trim 1 with a hook provided on the vehicle body 2, and means for fastening the deck side trim 1 to the vehicle body 2 by means of a screw, a clip or the like.

The cover accommodating body 51 of the tonneau cover 52 whose left and right ends are accommodated in the accommodating recesses 12 of the left and right deck side trims 1 can appropriately be attached and detached. A user can appropriately select one of the attaching state shown in FIGS. 1 and 2 and the detached state shown in FIGS. 7 and 8. When the luggage space 53 is to be covered using the tonneau cover 52 as shown in FIG. 17, the tonneau cover 52 is stretched in a state where both ends of the cover accommodating body 51 are accommodated in the accommodating recesses 12 of the left and right deck side trims 1.

Next, the procedure when the deck side trim 1 is mounted on the vehicle body 2 will be explained.

Figure 10:
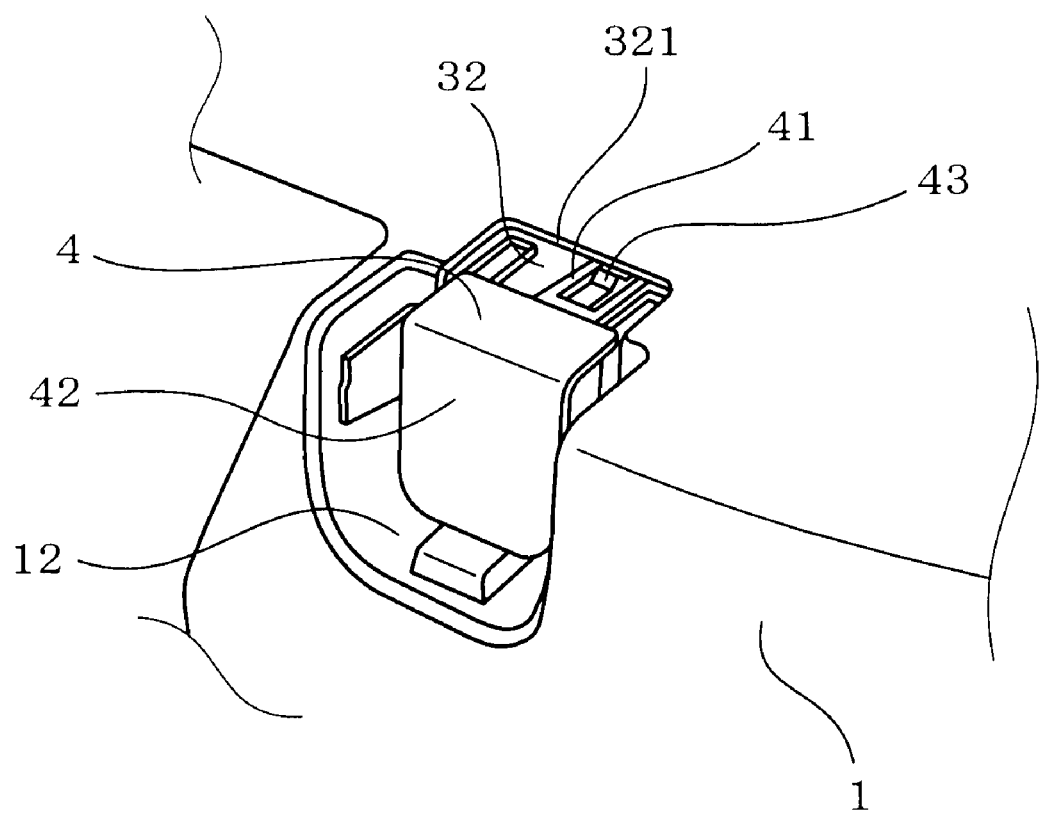
FIG. 10 is a perspective view of the vicinity of the accommodating recess in a state where a cap body is temporarily attached in the embodiment.

First, as shown in FIGS. 3, 4 and 10, a deck side trim 1 in a state where the cap body 4 is temporarily attached to the clamp portion 3 is prepared. That is, the deck side trim 1 is supplied to an assembling process in a state where the cap leg 41 of the cap body 4 is halfway inserted into the inner hole 32 of the clamp portion 3, and the temporarily-attaching engaging portion 44 of the cap leg 41 is engaged with the clamp inner engaging portion 33.

Figure 5:
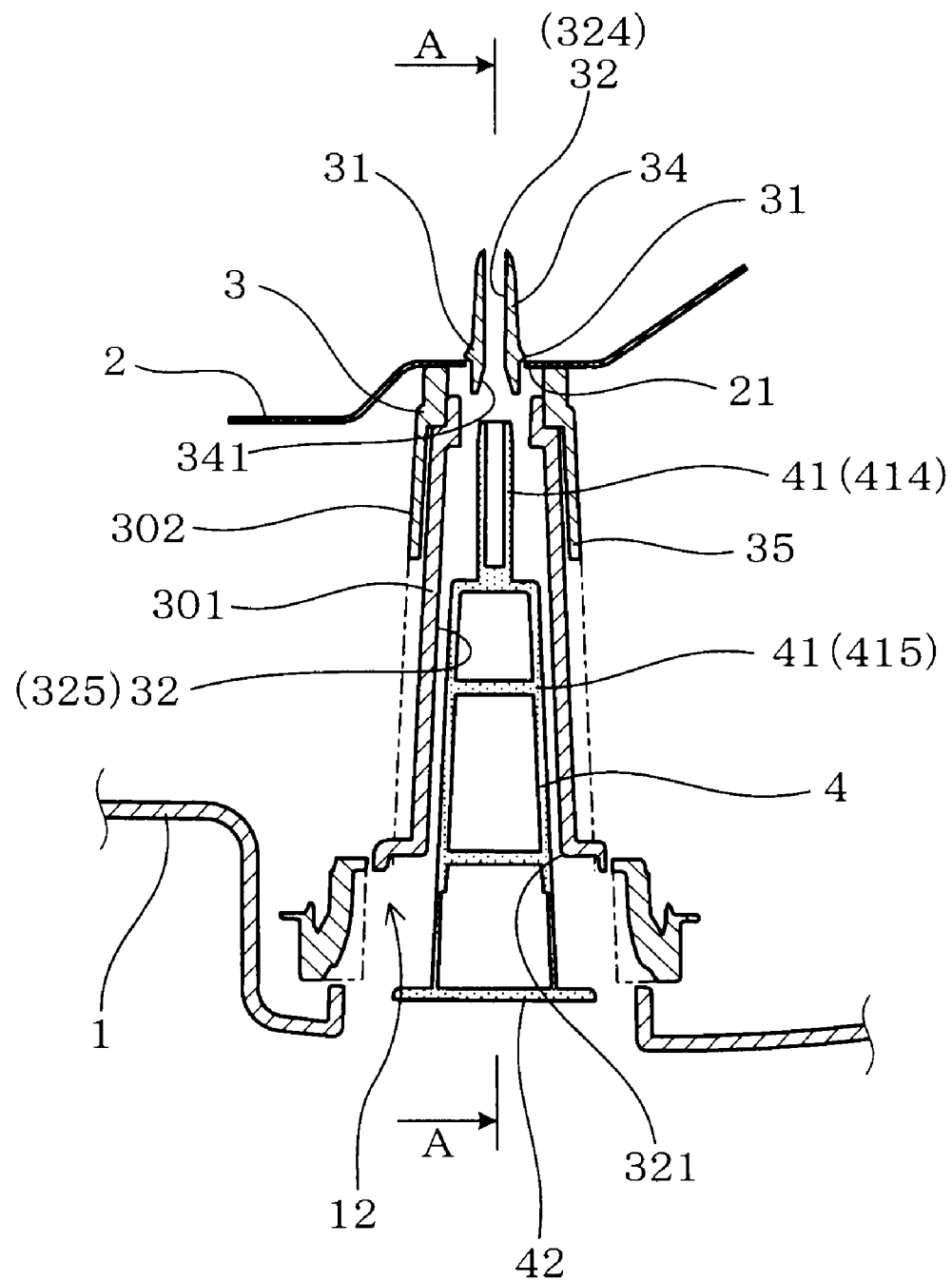
FIG. 5 is a sectional explanatory view of a state immediately before the deck side trim is fixed to the vehicle body in the embodiment.
Figure 6:
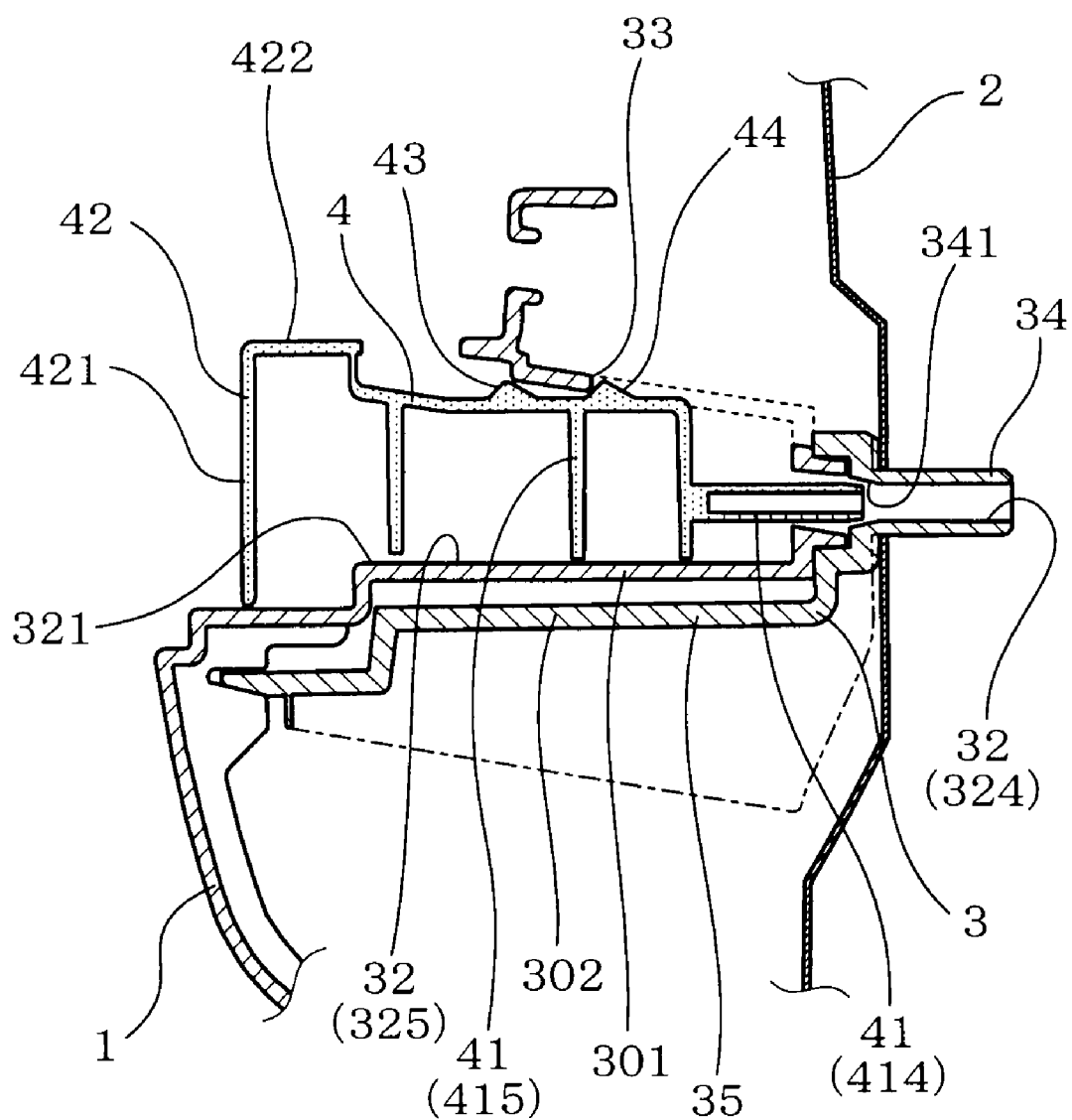
FIG. 6 is a sectional view taken along the line A-A in FIG. 5.

Next, the deck side trim 1 is disposed on a surface of the luggage space 53 of the vehicle body 2. Then, the clamp portion 3 of the deck side trim 1 is inserted into the body opening 22 of the vehicle body 2 as shown in FIGS. 5 and 6. At this time, the clamp tip end 34 is passed through the body opening 22, and the tip end surface of the clamp base body 35 is abutted against the vehicle body 2. Accordingly, the pair of engaging pawls 31 provided on the clamp tip end 34 pass through the body opening 22 and are disposed at locations opposite to the clamp base body 35 with respect to the body engaging portion 21.

Figure 7:
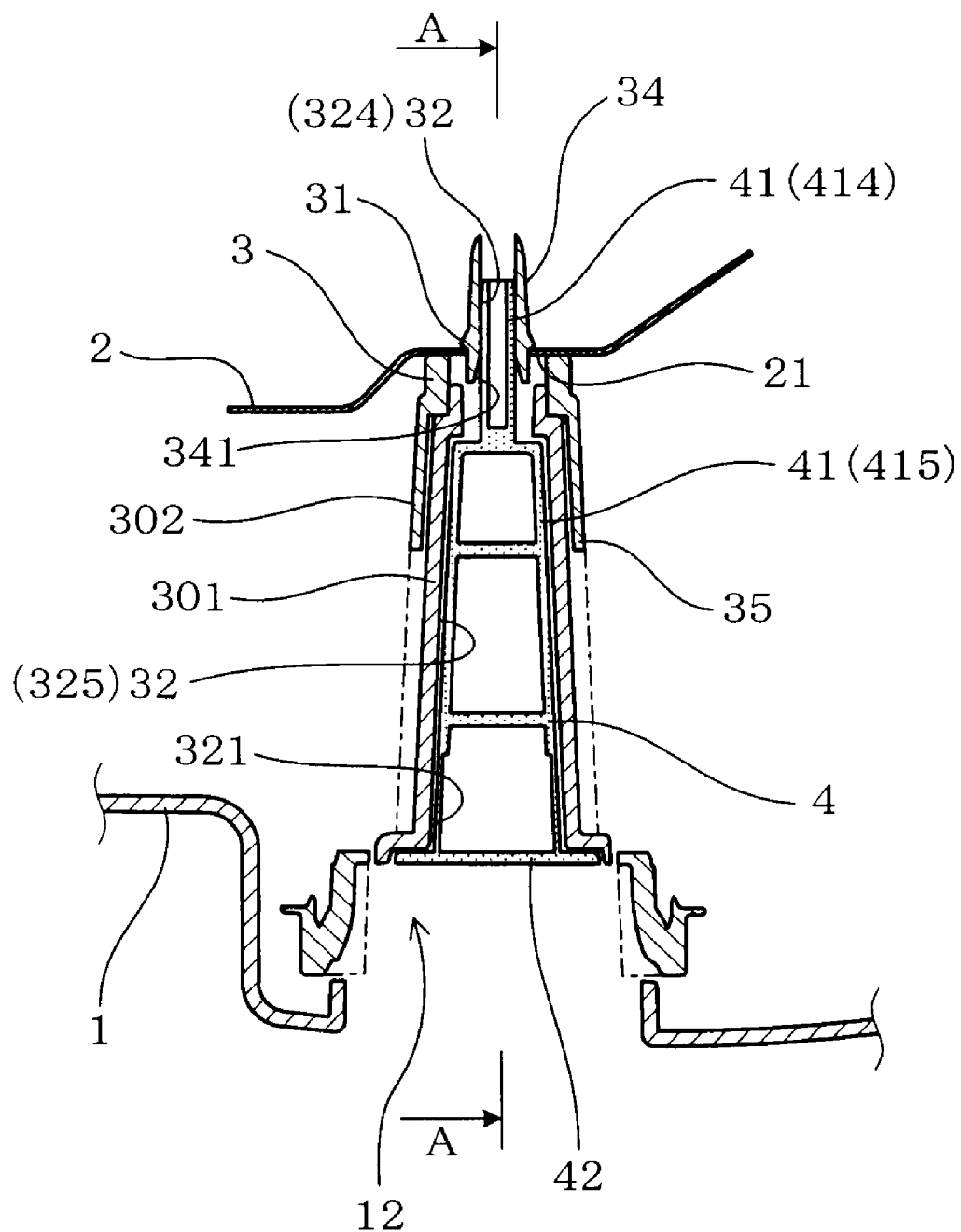
FIG. 7 is a sectional explanatory view of the mounting structure of the deck side trim in a state where a cover accommodating body is detached from the accommodating recess.
Figure 8:
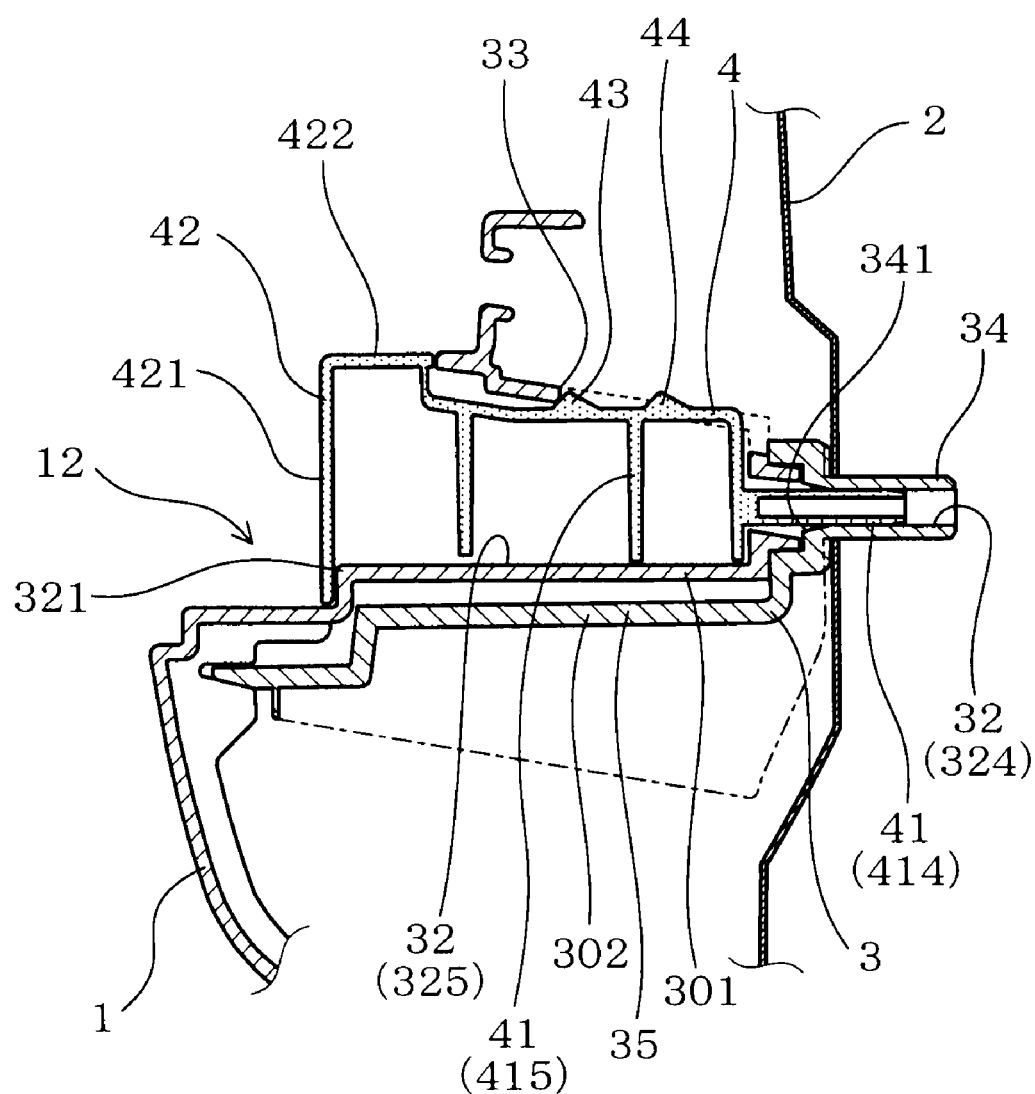
FIG. 8 is a sectional view taken along the line A-A in FIG. 7.
Figure 11:
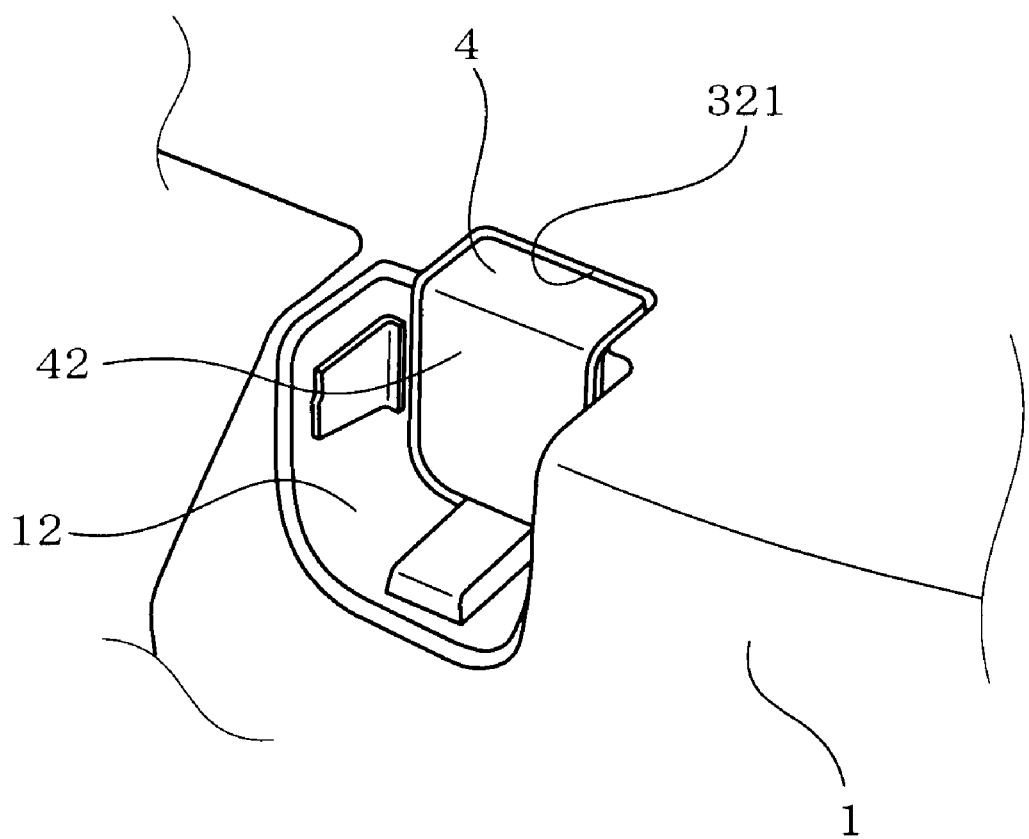
FIG. 11 is a perspective view of the vicinity of the accommodating recess of the mounting structure of the deck side trim in the embodiment.
Figure 12:
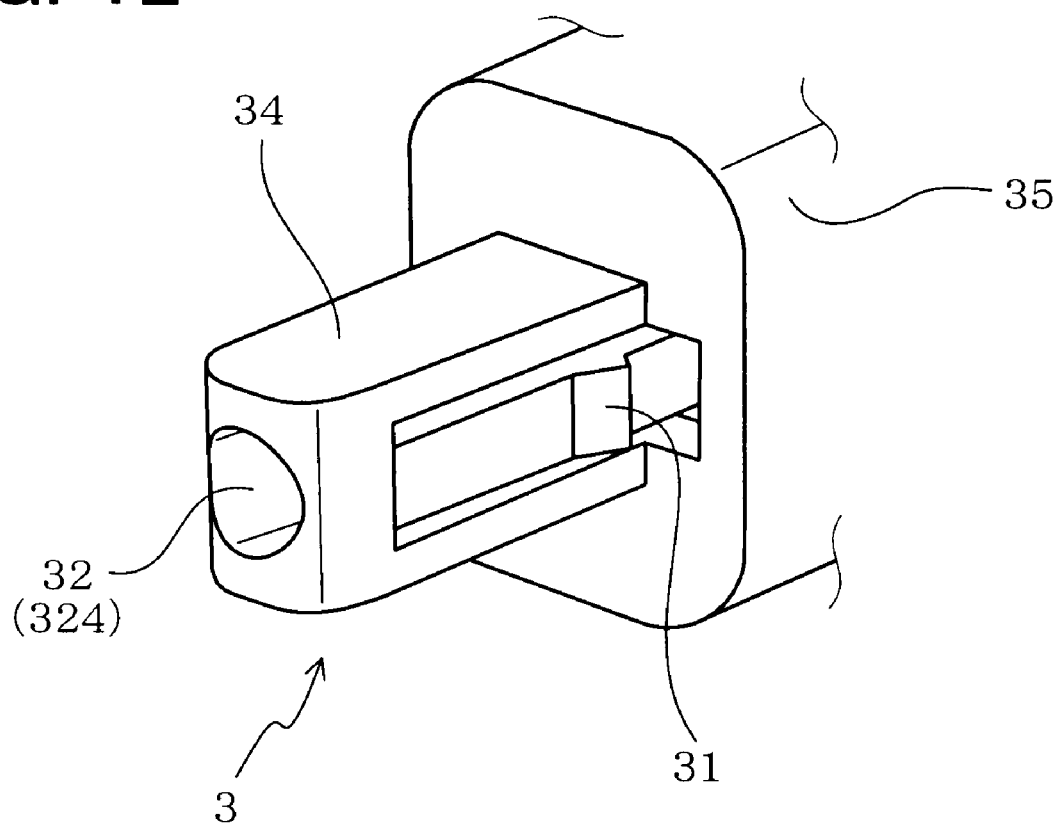
FIG. 12 is a perspective view of a clamp portion of the embodiment.

In this state, the cap body 4 is pushed into the tip end side (vehicle body 2 side) as shown in FIGS. 7, 8 and 11. With this, the cap leg 41 moves forward in the inner hole 32 of the clamp portion 3. The leg tip end 414 of the cap leg 41 enters the tip end inner hole 324 inside the clamp tip end 34 from the inlet tapered portion 341. Accordingly, the inner diameter of the tip end inner hole 324 is enlarged, and the clamp tip end 34 is pushed and enlarged outward in the circumferential direction. Therefore, the engaging pawl 31 provided on the outer peripheral surface of the clamp tip end 34 is engaged with the body engaging portion 21 of the vehicle body 2.

As shown in FIG. 8, the fixing engaging portion 43 provided on the leg base body 415 of the cap leg 41 is engaged with the clamp inner engaging portion 33. With this, the cap body 4 is fixed such that it will not be pulled out from the inner hole 32 of the clamp portion 3. Since the cap body 4 is not pulled out from the inner hole 32 of the clamp portion 3, the engaging pawl 31 of the clamp portion 3 does not return inward. Therefore, the engaged state between the clamp portion 3 and the vehicle body 2 is maintained, and the deck side trim 1 is fixed to the vehicle body 2.

Such a mounting operation of the deck side trim 1 is carried out on both left and right deck sides of the vehicle.

The mounting operation at the fastening position of the accommodating recess 12 is carried out as described above, but the fixing operation is appropriately carried out also at the fixing portion 13 of the position other than the accommodating recess 12 shown in FIG. 14.

Next, effects of the embodiment will be explained.

Figure 18:
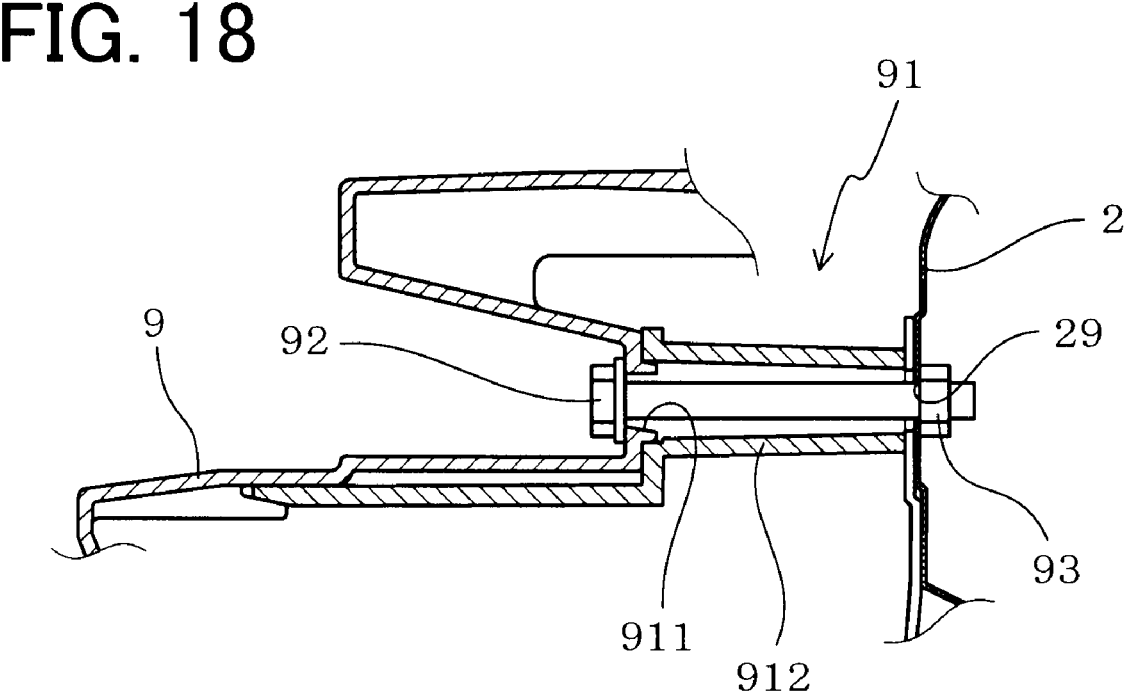
FIG. 18 is a sectional explanatory view of a mounting structure of a deck side trim in a conventional example.

In the mounting structure of the deck side trim, the deck side trim 1 is fixed to the vehicle body 2 using the cap body 4. Therefore, at least in the fastening portion using the cap body 4, the deck side trim 1 can be fixed to the vehicle body 2 by fitting the cap body 4 into the inner hole 32 of the clamp portion 3 provided on the deck side trim 1. At that time, it is unnecessary to carry out the screwing operation unlike the case where a bolt is used (see FIG. 18), and it is also unnecessary to use a tool such as an impact wrench. In other words, the fixing operation can be completed only by pushing in the cap head 42. Consequently, the fastening operation can easily be carried out.

Since the deck side trim 1 is mounted in the vehicle interior, it has been difficult to mount the deck side trim 1 on the vehicle body 2 in the conventional technique, but as described above, the deck side trim 1 can easily be mounted on the vehicle body 2 with a simple operation, i.e., only by fitting the cap body 4. Thus, it is possible to prevent the design surface of the deck side trim 1 from being damaged during the assembling operation.

The opening 321 of the inner hole 32 of the clamp portion 3 which is opened on the design surface side of the deck side trim 1 can be closed with the cap head 42 of the cap body 4. Thus, the outward appearance design of the deck side trim 1 can be enhanced. Further, the cap body 4 is a single member which has both a fixing function for engaging the engaging pawl 31 of the clamp portion 3 with the vehicle body 2, and a cap function for covering the opening 321. Thus, the number of parts used can be reduced and the mounting operability can be enhanced.

Further, since the cap leg 41 is provided on its side surface with the fixing engaging portion 43, the cap body 4 can easily and reliably be held in the inner hole 32 of the clamp portion 3. With this, it is possible to easily fix the deck side trim 1 to the vehicle body 2 and to prevent the deck side trim 1 from being pulled out from the vehicle body 2.

That is, as shown in FIG. 2, by engaging the fixing engaging portion 43 with the clamp inner engaging portion 33, the cap body 4 is fixed such that the cap body 4 will not be pulled out from the inner hole 32 of the clamp portion 3. Since the cap body 4 is not pulled out from the inner hole 32 of the clamp portion 3, the engaging pawl 31 of the clamp portion 3 does not return inward as shown in FIG. 1. Thus, the engaged state between the clamp portion 3 and the vehicle body 2 is reliably held.

The cap leg 41 includes the temporarily-attaching engaging portion 44. Therefore, as shown in FIG. 6, the cap body 4 can be temporarily attached before the deck side trim 1 is mounted on the vehicle body 2. That is, since the cap leg 41 has the temporarily-attaching engaging portion 44 located closer to the tip end than the fixing engaging portion 43, the cap body 4 can temporarily be attached to the deck side trim 1 by engaging the temporarily-attaching engaging portion 44 with the clamp inner engaging portion 33.

With this, if the cap body 4 is pushed in after the deck side trim 1 to which the cap body 4 is attached has been positioned with respect to the vehicle body 2, the fixing engaging portion 43 of the cap leg 41 is engaged with the clamp inner engaging portion 33 instead of the temporarily-attaching engaging portion 44, and the deck side trim 1 is fixed to the vehicle body 2.

Since the cap leg 41 has the temporarily-attaching engaging portion 44 as described above, the deck side trim can be fixed to the vehicle body 2 more easily.

As described above, according to the present embodiment, it is possible to provide a mounting structure of a deck side trim in which the mounting operability on the vehicle body is excellent, the number of parts used is small and the outward appearance design is excellent.

Obviously, numerous modifications and variations of the present invention are possible in light of the above teachings. It is therefore to be understood that, within the scope of the appended claims, the invention may be practiced otherwise than as specifically described here.

What is claimed is:

1. A mounting structure of a deck side trim for mounting on a vehicle body, wherein the deck side trim is disposed on a side surface of a luggage space in a rear portion of a vehicle, and is provided at its upper side with accommodating recesses in which are accommodated and disposed left and right ends of a cover accommodating body which winds and accommodates a tonneau cover covering the luggage space, the accommodating recess is provided with a clamp portion which is formed so as to project toward the vehicle body and which is provided at its side with an engaging pawl that is engaged with the vehicle body, the clamp portion includes an inner hole which is provided with an opening at least on the accommodating recess side, the inner hole being formed from the opening toward a tip end in an axial direction, a cap body for closing the opening is disposed in the inner hole, the cap body including a cap leg fitted into the inner hole and a cap head formed on a rear end of the cap leg, and when the cap leg of the cap body is fitted into the inner hole, the engaging pawl in the clamp portion is pushed outward, and the engaging pawl is engaged with a body engaging portion provided on the vehicle body.

2. The mounting structure of the deck side trim according to claim 1, wherein the cap leg is provided on its side surface with a fixing engaging portion which is engaged with a clamp inner engaging portion provided on an inner wall of the inner hole when the cap leg is fitted into the inner hole of the clamp portion.

3. The mounting structure of the deck side trim according to claim 2, wherein the cap leg includes a temporarily-attaching engaging portion at a location closer to the tip end than the fixing engaging portion, the temporarily-attaching engaging portion being capable of engaging with the clamp inner engaging portion.

* * * * *